Patented Oct. 7, 1930

1,777,366

UNITED STATES PATENT OFFICE

CECIL HOLLINS AND ERNEST CHAPMAN, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF AERATED WATERS, SPARKLING DRINKS, AND THE LIKE

No Drawing. Original application filed August 5, 1927, Serial No. 211,002, and in Great Britain August 19, 1926. Divided and this application filed July 9, 1928. Serial No. 291,472.

In our copending application Ser. No. 211,002, of which the present application is a division, we have set forth and claimed certain new and useful improvements in the manufacture of aerated waters, sparkling drinks and the like. The present invention relates to flavoring syrups and the like suitable for preparing the effervescent potable liquids of the said copending application and it further relates to processes for making these flavoring syrups and the like.

One of the disadvantages of ordinary aerated waters is that as soon as the liquid is poured into a glass, practically all the gas with which it is charged is given off at once and the liquid becomes "fat" and loses its sparkle.

We have discovered that if a small proportion, e. g. 0.01–0.1 per cent of certain substances hereinafter described be included in the ingredients of the liquid before or after aeration, the liquid acquires the property of retaining the gas with which it is charged and the latter is evolved more gradually on exposure to air, with formation in most cases of a "froth".

The substances we use for this purpose belong to the classes known as dispersing agents and wetting-out agents, namely, the sulphonic acids derived from formaldehyde-naphthalene or formaldehyde-phenol condensation products, the alkylnaphthalene sulphonic acids, the substances prepared from mineral oils and isopropyl alcohol sulphonated according to co-pending application No. 195,585, filed by one of us, Ernest Chapman, and another, ligninsulphonic acids, naphthenic acids, taurocholic acid, sulphonated higher fatty acids, and the like.

According to the present invention, these substances (usually in the form of their sodium salts) are added to the flavouring solutions used in so-called "soda-fountains". It is understood, of course, that the substances used should be free from all poisonous impurities.

Methods of applying our invention are illustrated by, but not limited to, the following examples.

*Example 1.*—To the usual flavouring syrup is added from 0.1 to 0.2% of its weight of a substance included in the above description in the form of concentrated solution. The flavouring syrup is then run in small portions into bottles which are filled up with water and aerated in the usual manner.

*Example 2.*—To a flavouring syrup for use in soda-fountains is added sufficient of one of the dispersing agents, defined to provide with each "dose" of the syrup about 0.05 gm. of dispersing agent, the "dose" being the amount of flavouring syrup used for an ordinary tumbler full (i. e. about 10 fluid oz.) of effervescent drink.

What we claim and desire to secure by Letters Patent is:—

1. In the manufacture of flavouring syrups and the like suitable for preparing effervescent, potable liquids containing dissolved carbon dioxide as an essential ingredient and having the property of retaining their sparkle without becoming flat, the process which comprises adding to such flavouring syrup and the like, at some stage of manufacture a sulphonic acid of higher molecular weight belonging to the class of wetting-out and dispersing agents.

2. In the manufacture of flavouring syrups and the like suitable for preparing effervescent potable liquids containing dissolved carbon dioxide as an essential ingredient and having the property of retaining their sparkle without becoming flat, the process which comprises adding to such flavouring syrups and the like at some stage of manufacture sulphonated isopropylated petroleum fractions.

3. Flavouring syrups and the like suitable for preparing effervescent potable liquids containing dissolved carbon dioxide and having the property of retaining their sparkle without becoming flat, containing as an added ingredient a sulphonic acid of high molecular weight belonging to the class of wetting-out and dispersing agents.

4. Flavouring syrups and the like suitable for preparing effervescent potable liquids containing dissolved carbon dioxide as an essential ingredient and having the property of retaining their sparkle without becoming flat, containing as an added ingredient sulphonated isopropylated petroleum fractions.

In testimony whereof we affix our signatures.

CECIL HOLLINS.
ERNEST CHAPMAN.